United States Patent
Ozugur et al.

(10) Patent No.: US 8,126,130 B1
(45) Date of Patent: Feb. 28, 2012

(54) SYSTEM AND METHOD FOR COUPLING AN INSTANT MESSAGING SESSION WITH A PBX CALL SESSION

(75) Inventors: Timucin Ozugur, Fairview, TX (US); Jack Jachner, Plano, TX (US)

(73) Assignee: Alcatel Lucent, Paris (FR)

( * ) Notice: Subject to any disclaimer, the term of this patent is extended or adjusted under 35 U.S.C. 154(b) by 1229 days.

(21) Appl. No.: 11/282,129

(22) Filed: Nov. 18, 2005

Related U.S. Application Data

(63) Continuation-in-part of application No. 10/962,792, filed on Oct. 12, 2004.

(51) Int. Cl.
*H04M 3/42* (2006.01)
(52) U.S. Cl. ........... 379/207.02; 379/93.09; 379/265.09; 709/206
(58) Field of Classification Search ............. 379/211.02, 379/212.02, 265.09, 220.01
See application file for complete search history.

(56) References Cited

U.S. PATENT DOCUMENTS

| | | | | |
|---|---|---|---|---|
| 5,742,596 | A * | 4/1998 | Baratz et al. ............ | 370/356 |
| 5,937,057 | A * | 8/1999 | Bell et al. ............ | 379/265.02 |
| 2003/0023683 | A1 * | 1/2003 | Brown et al. ............ | 709/204 |
| 2003/0233416 | A1 * | 12/2003 | Beyda ............ | 709/206 |
| 2004/0008837 | A1 * | 1/2004 | Sylvain ............ | 379/265.09 |
| 2004/0158609 | A1 * | 8/2004 | Daniell et al. ............ | 709/206 |

OTHER PUBLICATIONS

Nortel Networks, MCS 5100 Feature Description Guide, Dec. 2003, MCP 2.0 Standard (02.02) Part No. NN10315-115, entire document.*

* cited by examiner

*Primary Examiner* — Ahmad Matar
*Assistant Examiner* — Jirapon Intavong
(74) *Attorney, Agent, or Firm* — Garlick Harrison & Markison

(57) ABSTRACT

System and method for coupling an IM session with a PBX call session are described. One embodiment is a multimedia session manager system comprising a first controller for controlling telephony services to a plurality of terminals; and a second controller for controlling IM services to a plurality of user communications devices; and wherein, responsive to application of a private branch exchange ("PBX") service to a telephony call, the second controller automatically applies a corresponding IM service to an IM session associated with the telephony call.

28 Claims, 3 Drawing Sheets

SYSTEM AND METHOD FOR COUPLING AN INSTANT MESSAGING SESSION WITH A PBX CALL SESSION

CLAIM OF PRIORITY UNDER 35 U.S.C. §120 & 37 C.F.R. §1.78

This nonprovisional application is a continuation-in-part application claiming the benefit of the following prior United States Patent Application entitled: "PRESENCE-BASED ROUTING IN A COMMUNICATIONS NETWORK ENVIRONMENT," application Ser. No. 10/962,792, filed Oct. 12, 2004, in the name(s) of Timucin Ozugur and Michael S. Wengrovitz, which is hereby incorporated by reference.

BACKGROUND OF THE INVENTION

1. Technical Field of the Invention

The present invention generally relates to instant messaging ("IM") systems. More particularly, and not by way of any limitation, the present invention is directed to system and method for coupling an IM session with a PBX call session such that call events with respect to the call also affect the IM session.

2. Description of Related Art

Private branch exchanges ("PBXes") and Class 5 switches currently support a wide variety of call features, including, but not limited to, call camping, call transfer, call conferencing, call hunting, and call recording. In contrast, current IM systems offer only one such feature, which is IM conferencing. In future IM systems, when richer presence is implemented, it is likely that a user's presence information will indicate whether the user has an open IM session. In this case, it would be beneficial to a second user who wants to communicate with the first user via IM to be able to take advantage of features similar to those available for calls in the context of IM. For example, the second user may want to "camp" on the user's communications device (similar to call camping on a telephone) or "message-back" (similar to ringing back on a telephone) the first user's communications device (similar to ringing back on a telephone), such that as soon as the first user closes the current IM session, an IM session with the second user will be automatically initiated (in the case of the IM camp feature) or the second user will be sent an IM notifying him of the fact that the first user has become available (in the case of the IM message back feature).

Another deficiency of current IM systems arises in connection with a situation in which, for example, a first user is communicating with a second user via both telephone and IM. It may become necessary or beneficial for the second user to transfer the call to a third user. In this scenario, the call will be transferred, but the IM session will not be; rather, in order for the first user to IM with the third user in connection with the transferred call, he will have to terminate the IM session with the second user and manually initiate a new IM session with the third user.

Therefore, what is needed is a method and system for coupling an IM session with a call such that the occurrence of certain call events with respect to the call have a corresponding impact on an IM session coupled therewith.

SUMMARY OF THE INVENTION

One embodiment is a multimedia session manager system comprising a first controller for controlling telephony services to a plurality of terminals; and a second controller for controlling IM services to a plurality of user communications devices; and wherein, responsive to application of a private branch exchange ("PBX") service to a telephony call, the second controller automatically applies a corresponding IM service to an IM session associated with the telephony call.

Another embodiment is a method of operating a multimedia session manager system for controlling telephony services to a plurality of terminals and controlling IM services to a plurality of user communications devices. The method comprises applying a selected PBX service to a telephony call; and responsive to the application of a selected PBX service to a telephony call, automatically applying a IM service corresponding to the selected PBX service to an IM session associated with the telephony call.

Another embodiment is a multimedia session manager system for controlling telephony services to a plurality of terminals and controlling IM services to a plurality of user communications devices. The system comprises means for applying a selected PBX service to a telephony call; and means responsive to the application of a selected PBX service to a telephony call for automatically applying a IM service corresponding to the selected PBX service to an IM session associated with the telephony call.

Another embodiment is a computer-readable medium operable with a computer for operating a multimedia session manager system for controlling telephony services to a plurality of terminals and controlling IM services to a plurality of user communications devices. The medium has stored thereon instructions executable by the computer for applying a selected PBX service to a telephony call; and instructions executable by the computer responsive to the application of a selected PBX service to a telephony call for automatically applying a IM service corresponding to the selected PBX service to an IM session associated with the telephony call.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
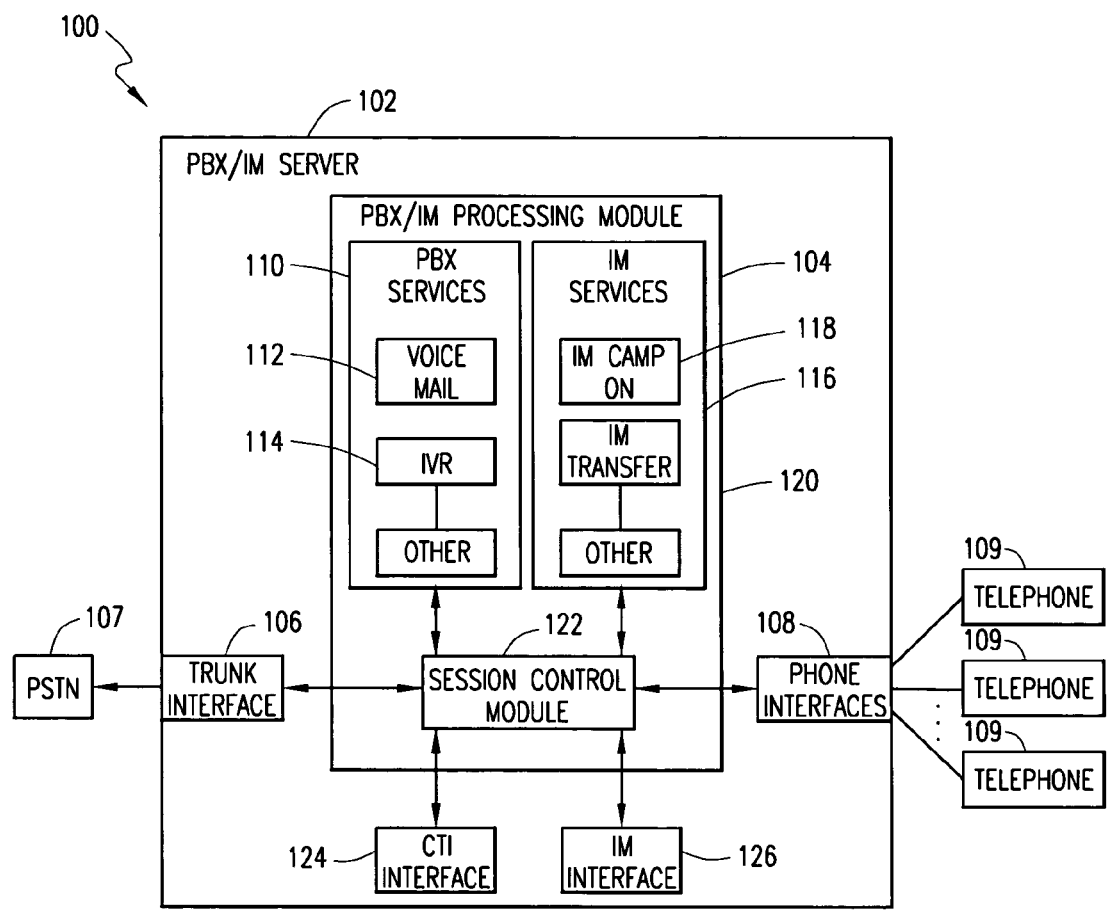
FIG. 1 is a system block diagram of an embodiment for coupling an IM session with a PBX call session in which PBX and IM processing functionality reside on a single server.

Embodiments of the invention will now be described with reference to various examples of how the invention can best be made and used. Like reference numerals are used throughout the description and several views of the drawings to indicate like or corresponding parts, wherein the various elements are not necessarily drawn to scale.

Referring now to the drawings, FIG. 1 illustrates a block diagram of a system 100 for coupling an IM session with a PBX call session such that call events with respect to the call also affect the IM session. In the embodiment illustrated in FIG. 1, call processing functionality, IM processing functionality, and video processing functionality are combined within a single server unit 102. The unit 102 is responsible for media blending and call/IN/video session control.

Some of the call events with which an IM session can be coupled include, but are not limited to, call transfer/redirect, call waiting, start/stop recording, call pickup, and call hunting. Call transfer/redirect enables a first user (e.g., "User A") to redirect incoming calls to a second user (e.g., "User B") by depressing special keys on the telephone set. In accordance with an embodiment described herein, a corresponding feature for use in connection with IM systems, incoming IMs to User A can also be transferred/redirected to User B.

The call waiting feature operates in the following manner. When User A calls User B and User B's telephone is busy, User A can initiate the call waiting feature, such that the call is placed in a "call waiting" mode. In accordance with an embodiment described herein, a corresponding IM from User A to User B will be placed in an "IM waiting" mode.

The start/stop recording feature operates in the following manner. When User A configures an incoming call from User B to be recorded, a corresponding IM from User B will be recorded as well. Finally, the call pickup feature, User A can answer another user's (e.g., User B's) phone by depressing one or more keys on his telephone. A corresponding IM pickup feature enables User A to pick up User B's incoming IMs as well.

Call hunting groups, and correspondingly, IM hunting groups, operate in the manner described in detail in U.S. patent application Ser. No. 11/282,914, filed Nov. 18, 2005, entitled SYSTEM AND METHOD FOR IMPLEMENTATION OF INSTANT MESSAGING HUNTING GROUPS. The IM hunting group function can be integrated with the call hunting group function such that when a call hunting group is activated, the associated IM hunting group is activated simultaneously. In this manner, a user who wants to communicate with any member of the hunting group can both call and IM the hunting group and be assured that both the call and the IM will be assigned to the same group member.

Using the embodiments described herein, an IM session coupled with a call for which the hunting group feature has been implemented will follow the call to the group member to whom the call is ultimately assigned.

Referring again to FIG. 1, the server unit 102 comprises a PBX/IM processing module 104 connected between a trunk interface 106, which enables connectivity of the server unit 102 to a local PSTN, and telephone interfaces 108, which enable connectivity with telephones 109. A PBX services module 110 comprises 500+ services that are defined for voice sessions, including, but not limited to, voice mail 112 and IVR 114. An IM services module 116 comprises a plurality of IM services, many of which correspond to one of the PBX services, including, but not limited to, IM camp 118 and IM transfer 120. A session control module 122, which includes a first controller and a second controller functionality that may be separated in some embodiments, is the core of the system 102 and orchestrates the services available for the users. Therefore, when call events are coupled with IM events, as described hereinbelow, the module 122 orchestrates these events. A computer/telephony integration ("CTI") interface 124 functions to enable telephony services via a computer. An IM interface 126 enables connectivity to IM services, which most likely follow the IETF SIP/SIMPLE standard.

Figure 2:
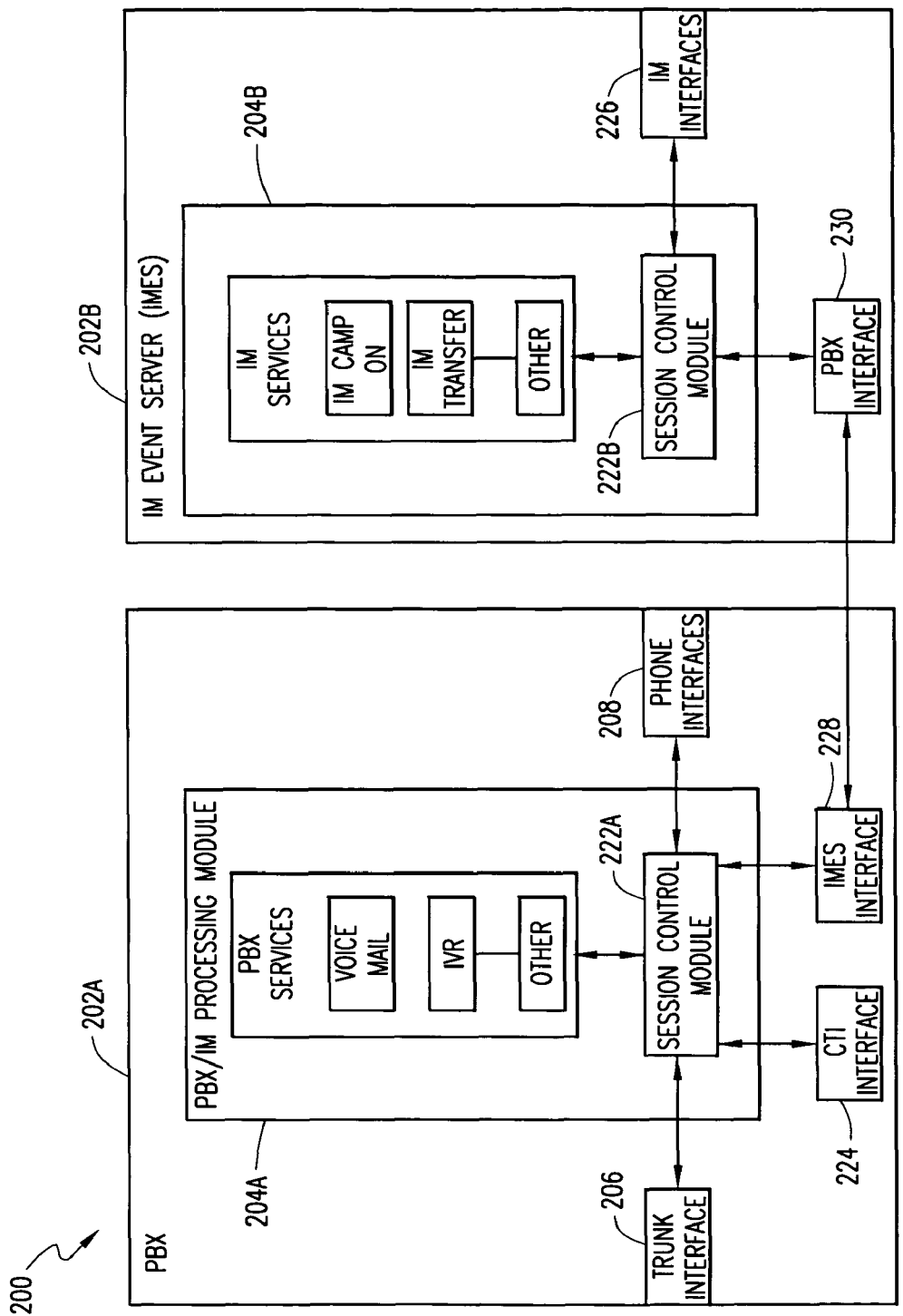
FIG. 2 is a system block diagram of an alternative embodiment for coupling an IM session with a PBX call session in which PBX and IM processing functionality reside on separate servers.

FIG. 2 illustrates a block diagram of an alternative system 200 for coupling an IM session with a PBX call session such that call events with respect to the call also affect the IM session. In the embodiment illustrated in FIG. 2, in contrast with the embodiment illustrated in FIG. 1, call processing functionality and IM processing functionality reside in two separate servers comprising a PBX server 202A and an IM event server ("IMES") 202B. The PBX server 202A includes a PBX processing module 204A comprising a PBX services module 210, which is identical to the PBX services module 110. Similarly, the IMES 202B includes an IM processing module 204B comprising an IM services module 216, which is identical to the IM services module 116.

Each of the servers 202A, 202B, includes its own session control module 222A, 222B, respectively, which comprise the core of the system for orchestrating the services available to users. Additionally, the PBX server 202A includes an IMES interface 228 for interfacing the session control module 222A with the session control module 222B via a PBX interface 230 of the IMES 202B. Therefore, when call events are coupled with IM events, as described hereinbelow, the modules 222A and 222B, interfaced via interfaces 228 and 230, orchestrate these events.

The PBX server 202A includes a trunk interface 206, a phone interface 208, and a CTI interface 224, which are identical to the trunk interface 106, phone interface 108, and CTI interface 124, respectively, of the system 100. Similarly, the IMES 202B includes an IM interface 226 identical to the IM interface 126 of the system 100.

Those skilled in the art should appreciate that the various server embodiments exemplified above may reside in suitable presence-aware networks such as those described in the following co-pending U.S. patent application entitled: "PRESENCE-BASED ROUTING IN A COMMUNICATIONS NETWORK ENVIRONMENT," application Ser. No. 10/962,792, filed Oct. 12, 2004, which has been incorporated by reference.

Figure 3:
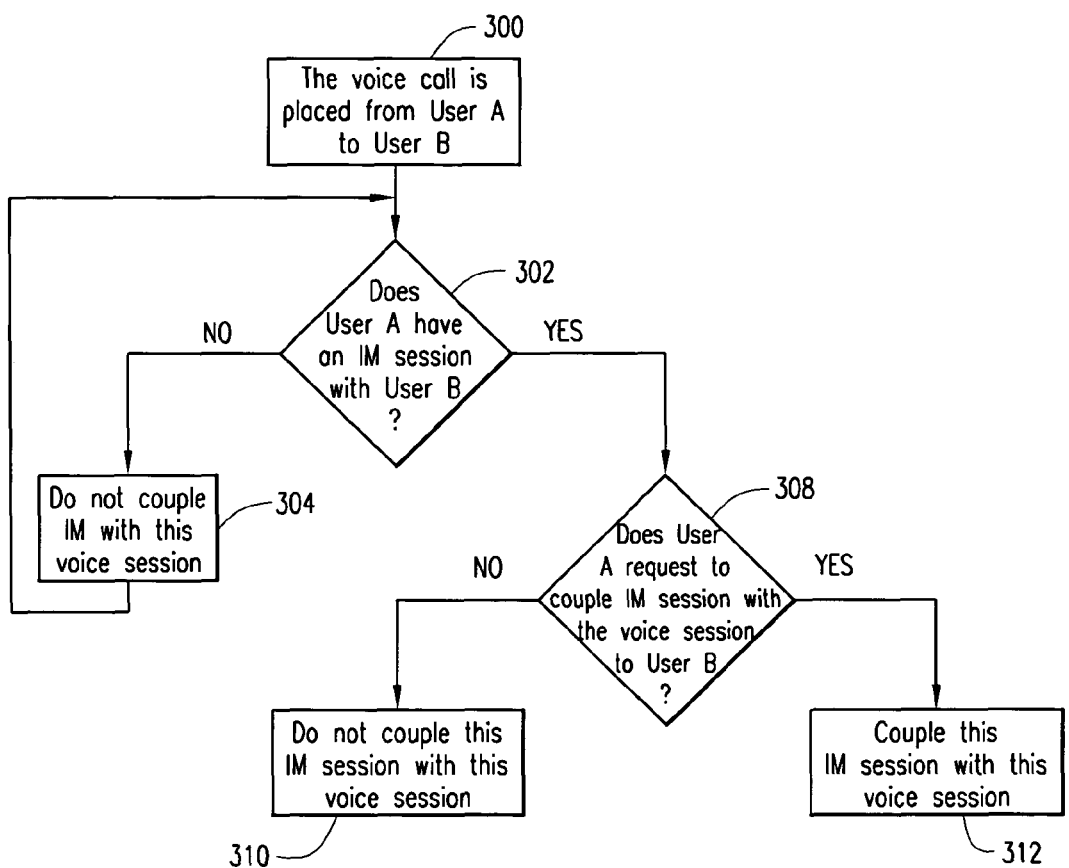
FIG. 3 is a flowchart of an embodiment for coupling an IM session with a PBX call session.

FIG. 3 is a flowchart illustrating operation of one embodiment for coupling an IM session with a PBX call session. In step 300, a voice call is placed from User A to User B. In step 302, a determination is made whether User A has an IM session with User B. If not, execution proceeds to step 304, in which it is determined that there are no IM sessions to be coupled with the voice session. If a positive determination is made in step 302, execution proceeds to step 308, in which a determination is made whether User A would like to couple the IM session with the voice session. This decision can be reached in many ways; for example, a GUI window may appear and prompt User A to indicate whether or not he would like to couple the sessions.

If a negative determination is made in step 308, execution proceeds to step 310, in which it is concluded that the sessions are not to be coupled with one another; therefore, actions taken with respect to the voice session (e.g., forwarding) will not automatically be taken with respect to the IM session. If a positive determination is made in step 308, execution proceeds to step 312, in which the IM session is coupled with the voice session; therefore, actions taken with respect to the voice session (e.g., forwarding) will automatically be taken with respect to the IM session and vice versa.

An advantage of the embodiments described herein is that they provide IM functionality equivalent to 500+ PBX functionality for telephony sets. Additionally, they enable simultaneous PBX and IM functionality, such as simultaneous call/IM transfer, simultaneous call/IM call back, simultaneous call/IM pickup, and others.

Another advantage of the embodiments described herein is that they enable a telephony set to control IM functionality, such that one setting controls both call and IM events.

It is believed that the operation and construction of the present invention will be apparent from the Detailed Description set forth above. While the exemplary embodiments of the invention shown and described have been characterized as being preferred, it should be readily understood that various changes and modifications could be made therein without departing from the scope of the present invention as set forth in the following claims.

What is claimed is:

1. A multimedia session manager system comprising:
    a first controller for controlling telephony services, including private branch exchange (PBX) services, during telephony calls to a plurality of terminals; and
    a second controller coupled to the first controller for controlling Instant Messaging ("IM") services during IM sessions to a plurality of user communications devices;
    wherein the first controller and the second controller coupling a telephony call between a first user at a first terminal and a second user at a second terminal and an IM session separate from the telephony call and between the first user at a first user communication device and the second user at a second user communication device together so that, during the telephony call, responsive to application of a private branch exchange ("PBX") service to the telephony call by the first controller, the second controller automatically applying a corresponding IM service corresponding to the PBX service to the IM session associated with the telephony call.

2. The multimedia session manager system of claim 1 wherein the PBX service is a call waiting service and the corresponding IM service is a message waiting service.

3. The multimedia session manager system of claim 1 wherein the PBX service is a call transfer service and the corresponding IM service is a IM transfer service.

4. The multimedia session manager system of claim 1 wherein the PBX service is a call recording service and the corresponding IM service is a message recording service.

5. The multimedia session manager system of claim 1 wherein the PBX service is a call pickup service and the corresponding IM service is an IM pickup service.

6. The multimedia session manager system of claim 1 wherein the PBX service is a call camping service and the corresponding IM service is an IM camping service.

7. The multimedia session manager system of claim 1 wherein the plurality of user communications devices are selected from a group consisting of a personal computer, a personal digital assistant, and a mobile telephone.

8. A method of operating a multimedia session manager system, the method comprising:
    controlling telephony services, including private branch exchange (PBX) services, during telephony calls to a plurality of terminals by a first controller;
    controlling Instant Messaging ("IM") services during IM sessions to a plurality of user communications devices by a second controller coupled to the first controller;
    coupling a telephony call between a first user at a first terminal and a second user at a second terminal and an IM session separate from the telephony call and between the first user at a first user communication device and the second user at a second user communication device together;
    and
    during the telephony call, responsive to application of a selected PBX service to the telephony call, automatically applying a IM service corresponding to the selected PBX service to the IM session associated with the telephony call.

9. The method of claim 8 wherein the applying a selected private branch exchange ("PBX") service comprises applying a call waiting service and wherein the automatically applying a corresponding IM service comprises automatically applying a message waiting service.

10. The method of claim 8 wherein the applying a selected private branch exchange ("PBX") service comprises applying a call transfer service and wherein the automatically applying a corresponding IM service comprises automatically a IM transfer service.

11. The method of claim 8 wherein the applying a selected private branch exchange ("PBX") service comprises applying a call recording service and wherein the automatically applying a corresponding IM service comprises automatically a IM recording transfer service.

12. The method of claim 8 wherein the applying a selected private branch exchange ("PBX") service comprises applying a call pickup service and wherein the automatically applying a corresponding IM service comprises automatically a IM pickup transfer service.

13. The method of claim 8 wherein the applying a selected private branch exchange ("PBX") service comprises applying a call camping service and wherein the automatically applying a corresponding IM service comprises automatically a IM camping transfer service.

14. The method of claim 8 wherein the plurality of user communications devices are selected from a group consisting of a personal computer, a personal digital assistant, and a mobile telephone.

15. A multimedia session manager system, the system comprising:
    means for controlling telephony services, including private branch exchange (PBX) services, during telephony calls to a plurality of terminals;
    means for controlling Instant Messaging ("IM") services during IM sessions to a plurality of user communications devices;
    means for coupling a telephony call between a first user at a first terminal and a second user at a second terminal and an IM session separate from the telephony call and between the first user at a first user communication device and the second user at a second user communication device together;
    means for, during the telephony call and responsive to application of a selected PBX service to the telephony call, automatically applying a IM service corresponding to the selected PBX service to the IM session associated with the telephony call.

16. The system of claim 15 wherein the means for applying a selected private branch exchange ("PBX") service comprises means for applying a call waiting service and wherein the means for automatically applying a corresponding IM service comprises means for automatically applying a message waiting service.

17. The system of claim 15 wherein the means for applying a selected private branch exchange ("PBX") service comprises means for applying a call transfer service and wherein the means for automatically applying a corresponding IM service comprises means for automatically a IM transfer service.

18. The system of claim 15 wherein the means for applying a selected private branch exchange ("PBX") service comprises means for applying a call recording service and wherein the means for automatically applying a corresponding IM service comprises means for automatically a IM recording transfer service.

19. The system of claim 15 wherein the means for applying a selected private branch exchange ("PBX") service comprises means for applying a call pickup service and wherein the means for automatically applying a corresponding IM service comprises means for automatically a IM pickup transfer service.

20. The system of claim 15 wherein the means for applying a selected private branch exchange ("PBX") service comprises means for applying a call camping service and wherein the means for automatically applying a corresponding IM service comprises means for automatically a IM camping transfer service.

21. The system of claim 15 wherein the plurality of user communications devices are selected from a group consisting of a personal computer, a personal digital assistant, and a mobile telephone.

22. A computer-readable medium operable with a computer for operating a multimedia session manager system, the medium having stored thereon:
instructions executable by the computer for controlling telephony services, including private branch exchange (PBX) services, during telephony calls to a plurality of terminals;
instructions executable by the computer for controlling Instant Messaging ("IM") services during IM sessions to a plurality of user communications devices;
instructions executable by the computer for coupling a telephony call between a first user at a first terminal and a second user at a second terminal and an IM session separate from the telephony call and between the first user at a first user communication device and the second user at a second user communication device together; and
instructions executable by the computer during the telephony call and responsive to application of a selected PBX service to the telephony call for automatically applying a IM service corresponding to the selected PBX service to the IM session associated with the telephony call.

23. The medium of claim 22 wherein the instructions executable by the computer for applying a selected private branch exchange ("PBX") service comprise instructions executable by the computer for applying a call waiting service and wherein the instructions executable by the computer for automatically applying a corresponding IM service comprise instructions executable by the computer for automatically applying a message waiting service.

24. The medium of claim 22 wherein the instructions executable by the computer for applying a selected private branch exchange ("PBX") service comprise instructions executable by the computer for applying a call transfer service and wherein the instructions executable by the computer for automatically applying a corresponding IM service comprise instructions executable by the computer for automatically a IM transfer service.

25. The medium of claim 22 wherein the instructions executable by the computer for applying a selected private branch exchange ("PBX") service comprise instructions executable by the computer for applying a call recording service and wherein the instructions executable by the computer for automatically applying a corresponding IM service comprise instructions executable by the computer for automatically a IM recording transfer service.

26. The medium of claim 22 wherein the instructions executable by the computer for applying a selected private branch exchange ("PBX") service comprise instructions executable by the computer for applying a call pickup service and wherein the instructions executable by the computer for automatically applying a corresponding IM service comprise instructions executable by the computer for automatically a IM pickup transfer service.

27. The medium of claim 22 wherein the instructions executable by the computer for applying a selected private branch exchange ("PBX") service comprise instructions executable by the computer for applying a call camping service and wherein the instructions executable by the computer for automatically applying a corresponding IM service comprise instructions executable by the computer for automatically a IM camping transfer service.

28. The medium of claim 22 wherein the plurality of user communications devices are selected from a group consisting of a personal computer, a personal digital assistant, and a mobile telephone.

* * * * *